United States Patent [19]
Bidner et al.

[11] Patent Number: 6,024,075
[45] Date of Patent: Feb. 15, 2000

[54] ENGINE CONTROL SYSTEM WITH EXHAUST GAS RECIRCULATION AND METHOD FOR DETERMINING PROPER FUNCTIONING OF THE EGR SYSTEM IN AN AUTOMOTIVE ENGINE

[75] Inventors: David Karl Bidner, Livonia; Daniel V. Orzel; Jonathan D. Mehl, both of Westland; Ian Jay Czaja, Ann Arbor, all of Mich.

[73] Assignee: Ford Global Technologies, Inc., Dearborn, Mich.

[21] Appl. No.: 09/107,160

[22] Filed: Jun. 29, 1998

[51] Int. Cl.7 .................................................. F02M 25/07
[52] U.S. Cl. ..................................... 123/568.16; 73/117.3
[58] Field of Search ......................... 123/568.11, 568.16; 73/117.3, 118.1

[56] References Cited

U.S. PATENT DOCUMENTS

| | | |
|---|---|---|
| 4,770,146 | 9/1988 | Shibata et al. .......................... 123/479 |
| 5,103,655 | 4/1992 | Kano et al. ............................. 73/118.1 |
| 5,113,835 | 5/1992 | Seki et al. ........................... 123/568.16 |
| 5,474,051 | 12/1995 | Matsumoto et al. ............... 123/568.16 |
| 5,508,926 | 4/1996 | Wade ........................................ 701/29 |
| 5,540,091 | 7/1996 | Nakagawa .......................... 123/568.16 |
| 5,542,400 | 8/1996 | Matsumoto et al. ............... 123/568.16 |
| 5,617,833 | 4/1997 | Tomisawa et al. ................. 123/568.16 |
| 5,621,167 | 4/1997 | Fang-Cheng ....................... 123/568.16 |
| 5,632,257 | 5/1997 | Machida et al. ................... 123/568.16 |
| 5,639,961 | 6/1997 | Lautenschutz ..................... 123/568.16 |
| 5,664,548 | 9/1997 | Izutani et al. ...................... 123/568.16 |
| 5,675,080 | 10/1997 | Wada .................................... 73/118.1 |

*Primary Examiner*—Willis R. Wolfe
*Attorney, Agent, or Firm*—Jerome R. Drouillard

[57] ABSTRACT

An engine control for an automotive engine having an inlet system and an exhaust system includes an EGR valve for permitting exhaust gas to flow from the exhaust system to the inlet system, and an engine controller for operating the EGR valve by opening the valve during successive test periods separated by non-uniform intervals, while measuring engine speed response to the opening of the EGR valve so as to diagnose an improperly operating EGR valve.

8 Claims, 2 Drawing Sheets

ENGINE CONTROL SYSTEM WITH EXHAUST GAS RECIRCULATION AND METHOD FOR DETERMINING PROPER FUNCTIONING OF THE EGR SYSTEM IN AN AUTOMOTIVE ENGINE

FIELD OF THE INVENTION

The present invention relates to an engine control system having the capability of not only controlling exhaust gas recirculation (EGR) flow into an engine but also the capability of diagnosing improper operation of the EGR system.

DISCLOSURE INFORMATION

EGR systems have been used in automotive engines for more than a quarter century. Such systems have progressed from crude vacuum operated systems to newer devices operated by stepper motors or linear solenoids, or other devices known to those skilled in the art. Governmental regulations require that engine controllers used in modern day automotive vehicles have the capability of detecting improper operation of an EGR system. Such improper operation could arise due to combustion deposits, or faults in the wiring or other support subsystems needed to operate the EGR valve. One problem with detecting improper EGR operation resides in the fact that opening an EGR valve for onboard diagnostic purposes may produce an engine operating disturbance sufficient to cause the operator of the vehicle to believe that the engine is not operating properly when in fact all that is intended is to determine whether the EGR system is operating properly.

By means of a novel timing scheme for pulsing EGR to the engine, the present invention avoids negative perceptions on the part of the driver, while offering the ability to determine when the EGR is operating properly.

It is known to provide an EGR pulse to an engine and to observe a change in the pressure with the intake manifold, as disclosed in U.S. Pat. No. 5,621,167. The system described in the '167 patent will not, however, work in an engine not having a manifold pressure sensor such as an engine having mass airflow sensing for the purpose of controlling the engine's fuel injection system.

SUMMARY OF THE INVENTION

An engine control for an automotive engine having an inlet system and exhaust system includes a plurality of sensors for measuring engine operating parameters and an EGR valve for permitting a controlled amount of exhaust gas to flow from the exhaust system to the inlet system of the engine. An engine controller operatively connected with the sensors operates the EGR valve for diagnostic purposes by opening the valve during a plurality of test periods and by measuring engine speed response to the opening of the EGR valve. The test periods during which the EGR is open are preferably separated by non-uniform intervals. In the event that the engine speed response to EGR pulses falls below a predetermined threshold, the controller will increase the length of the test periods and attempt to obtain a speed change response from the engine.

It is an advantage of an engine control according to the present invention that proper operation of an EGR system may be determined without resort to engine operation which would be objectionable to a driver.

It is a further advantage of the present invention that proper operation of an EGR system may be verified not only in an absolute sense but also the degree of impairment, if any, of the EGR system may be determined.

Other objects, features, and advantages of the present invention will become apparent to the reader of this specification.

DETAILED DESCRIPTION OF PREFERRED EMBODIMENTS

Figure 1:
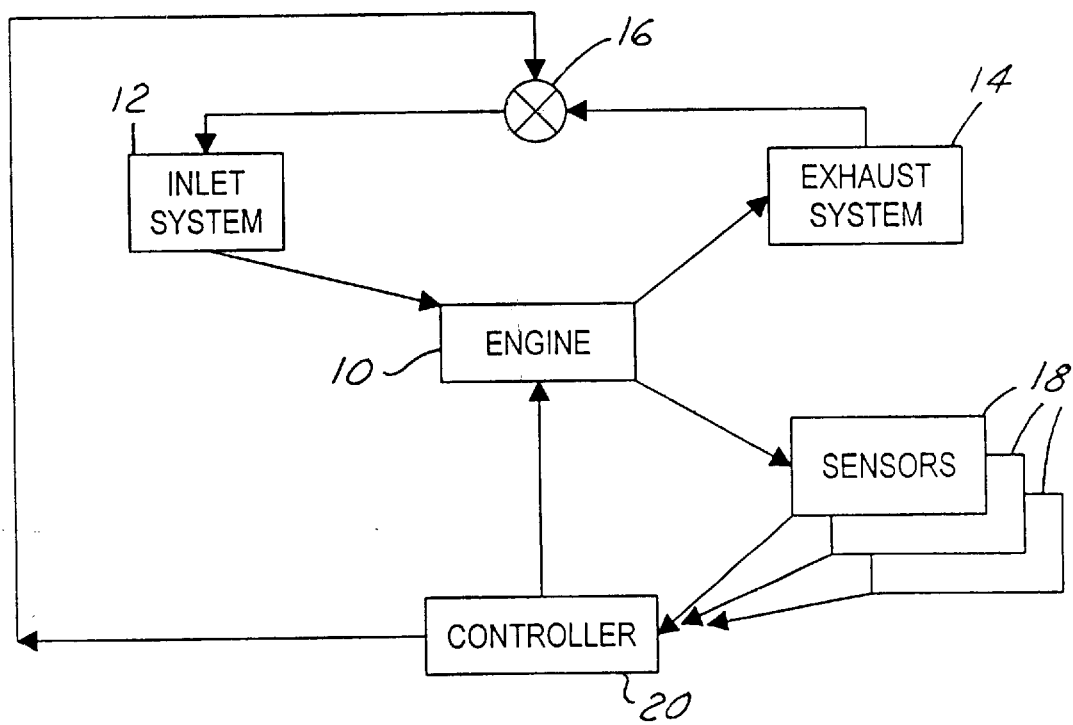
FIG. 1 is a schematic representation of an engine having a control system according to the present invention.

As shown in FIG. 1, engine 10 receives air and fuel from inlet system 12, with the products of combustion leaving the engine through exhaust system 14. EGR valve 16, which is operated by controller 20, controls the flow of EGR from exhaust system 14 and into inlet system 12. A plurality of sensors 18 measure various engine operating parameters such as engine coolant temperature, mass airflow, throttle position, spark timing, and other parameters known to those skilled in the art and suggested by this disclosure. Controller 20 is drawn from the class of engine controllers also known to those skilled in the art and suggested by this disclosure.

Figure 2:
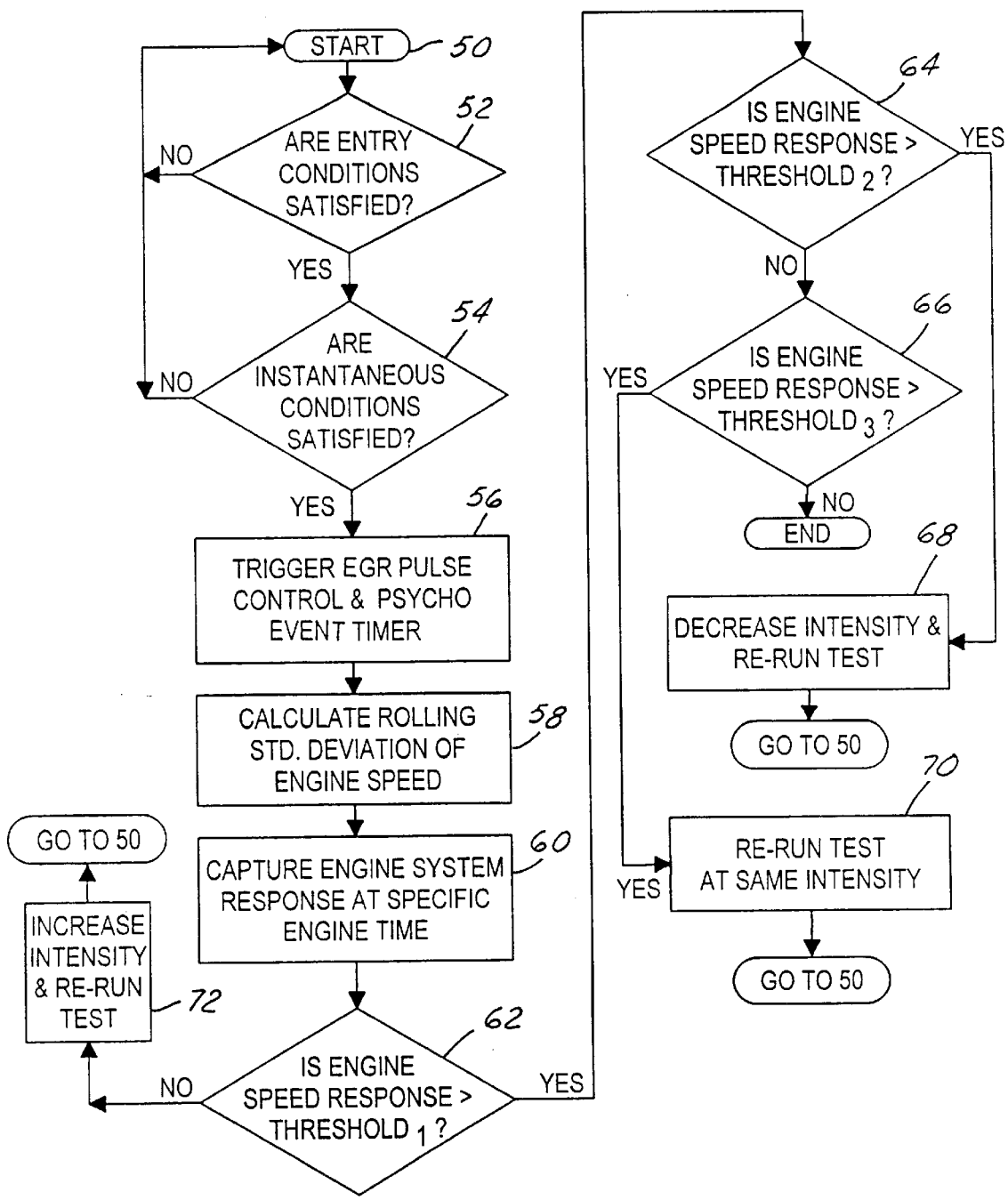
FIG. 2 is a flow diagram illustrating operation of an engine according to the present invention.

As shown in FIG. 2, controller 20 begins operating the EGR fault finding system according to the present invention with a question at block 52: are entry conditions satisfied? For example, if the engine is not warmed up to operating condition, a test sequence will not be performed. If the answer at block 52 is yes, controller 20 moves to block 54 wherein the question is asked: are instantaneous conditions satisfied? These conditions include the absence of operation of various engine accessories, such as power steering, air conditioning, air pumps, and other devices, which will cause changes in engine speed, particularly at idle. Although it is expected that the present system and method will most often be employed when the engine is idling, it may be possible to perform the test during other engine operating regimes.

If accessory loads are appropriate, in other words, there are no engine speed changes anticipated due to accessories, controller 20 moves to block 56 wherein an EGR pulse control is triggered. This is done according to a psycho event timer. The psycho event timer prevents objectionable disruption of engine operation by providing that the plurality of test periods will be separated by unequal or non-uniform intervals. Thus, in the absence of a uniform rhythm, the driver of the vehicle will not become aware that the EGR test is occurring.

At block 58, controller 20 calculates a rolling standard deviation of engine speed. The standard deviation is said to be rolling because the calculation runs continuously. The calculation preferably occurs at a rate which approaches the engine's ignition pulse rate.

After block 58, controller 20 moves to block 60, where the engine system's response to the EGR pulse is captured or measured. This response will be measured in terms of the peak value of the engine's speed response to the opening of the EGR valve. Also, immediately prior to acquiring the speed response, the background level of the rolling average standard deviation of engine speed will be recorded.

The actual window of observation of the engine's response is carefully controlled so as to avoid background error. Thus, the engine speed change is observed only during a plurality of predetermined windows corresponding to the timing of the test periods. In other words, engine speed change is observed only during predetermined windows of time when it is expected from either modeling or empirical results that engine's speed will actually change. Thus, transport phenomena or time delays due to the time necessary to transport a charge of EGR from EGR valve 16 and into inlet system 12 and engine 10 so that the effect of the mass of EGR will manifest itself in an engine speed change, is taken into account.

Having observed the engine speed response at block 60, controller 20 moves to block 62, wherein the engine's speed response is compared with a threshold value (Threshold$_1$) which comprises the background standard deviation of engine speed. This method and system has been found by the inventors to be particularly effective for determining engine speed changes resulting from relatively small amounts of EGR.

If the engine speed response exceeds Threshold$_1$, the EGR system is functioning properly, and at block 62 the answer is "yes" and controller 20 proceeds to block 64, wherein the engine speed response is compared to a second threshold, (Threshold$_2$). This second threshold at block 64 corresponds to the amount of engine speed change which would be expected if a particle of foreign matter were lodged under the seat of the EGR valve's pintle. In such case, the valve opening will produce a larger speed response than anticipated. If this is so, at block 64 the answer is "yes" and the intensity of the test is decreased at block 68 and rerun. By decreasing the intensity, it is meant that the amount of time and/or the distance to which valve 16 is opened will be made smaller so as to determine whether the rpm change in the engine will be accordingly affected. Conversely, increasing the intensity means either that valve 16 will be opened for a longer period of time, or to a greater extent, or both.

If at block 64 the engine speed response is less than Threshold$_2$, Controller 20 continues to block 66, where the engine speed is once again compared with a third threshold (Threshold$_3$), which corresponds to a maximum value of the standard deviation of engine speed. If the speed response exceeds Threshold$_3$, the test is re-run at the same intensity at block 70. This accounts for situations where the engine may have a naturally occurring speed variation in excess of what would normally be expected. If at block 66 the answer is no and the engine speed response is not greater than threshold$_3$, the routine ends with the conclusion that the GR system is operating properly.

Returning now to block 62, if the engine speed response is less than Threshold$_1$, this indicates that there may be a fault with the EGR system and at block 72 the intensity of the EGR valve opening will be increased and the test re-run. In this manner, the test may be re-run three or more times with varying increasing intensities, to satisfy controller 20 that in fact the EGR system in impaired, and if so, a fault code will be set by controller 20.

While the invention has been shown and described in its preferred embodiments, it will be clear to those skilled in the arts to which it pertains that many changes and modifications may be made thereto without departing from the scope of the invention.

What is claimed is:

1. An engine control for an automotive engine having an inlet system and an exhaust system, with said engine control comprising:

a plurality of sensors for measuring engine operating parameters;

an EGR valve for permitting exhaust gas to flow from the exhaust system to the inlet system of the engine; and an engine controller, operatively connected with said sensors, for operating the EGR valve by opening the EGR valve during a plurality of test periods separated by non-uniform intervals and by measuring the engine speed response to the opening of the EGR valve during predetermined periods corresponding to the timing of the test periods, with the controller increasing the intensity of the test periods in the event that the engine's speed response falls below a predetermined threshold and decreasing the length of the test periods in the event that the engine's speed response is greater than a predetermined threshold.

2. An engine control for an automotive engine having an inlet system and an exhaust system, with said engine control comprising:

a plurality of sensors for measuring engine operating parameters;

an EGR valve for permitting exhaust gas to flow from the exhaust system to the inlet system of the engine; and an engine controller, operatively connected with said sensors, for operating the EGR valve by opening the EGR valve during a plurality of test periods and by measuring the engine speed response to the opening of the EGR valve, wherein the test periods during which the EGR valve is opened are separated by nonuniform intervals.

3. An engine control according to claim 2, wherein the controller will increase the intensity of the test periods in the event that the measured engine speed response falls below a predetermined threshold.

4. An engine control according to claim 2, wherein the controller will decrease the intensity of the test periods in the event that the engine's speed response is greater than a predetermined threshold.

5. An engine control according to claim 2, wherein the controller measures the engine speed response to the opening of the EGR valve by observing the engine's speed change during a plurality of predetermined windows corresponding to the timing of the test periods and by comparing the observed engine speed change to a rolling average of the standard deviation of engine speed.

6. A method for determining proper operation of an EGR system of an automotive engine having an EGR valve operated by an engine controller, comprising the steps of:

opening the EGR valve during a plurality of test periods separated by non-uniform intervals;

measuring the engine's speed response to the opening of the EGR valve during predetermined periods corresponding to the timing of the test periods; and setting a fault code in the event that the engine's speed response is less than a predetermined threshold.

7. A method according to claim 6, further comprising the step of increasing the length of the test periods in the event that the engine's speed response falls below a predetermined threshold and decreasing the length of the test periods in the event that the engine's speed response is greater than a predetermined threshold.

8. A method according to claim 6, wherein the engine's speed response is compared with a rolling average of the standard deviation of engine speed.

* * * * *